Figures 1, 2:
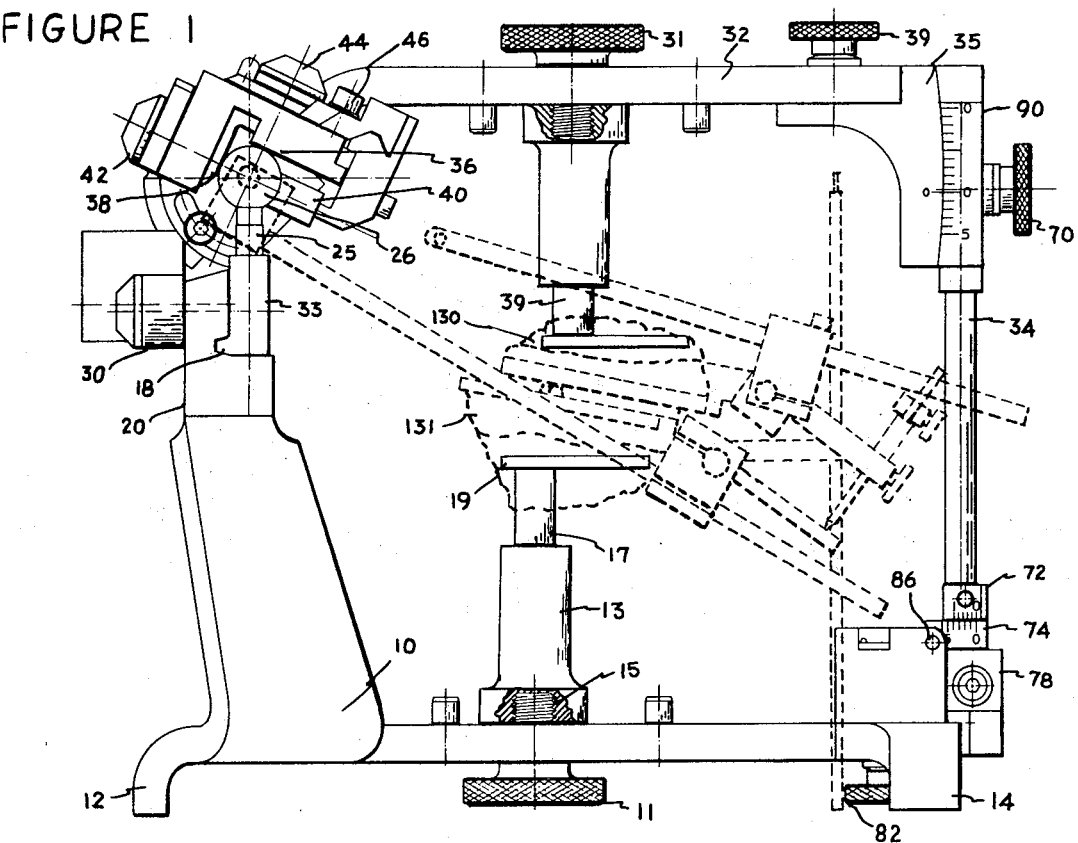

United States Patent
Guichet

[11] 3,708,882
[45] Jan. 9, 1973

[54] DENTAL ARTICULATOR ACCESSORY

[76] Inventor: Niles F. Guichet, 320 Olympia Place, Anaheim, Calif. 92806

[22] Filed: Dec. 10, 1970

[21] Appl. No.: 96,906

[52] U.S. Cl. ................................................... 32/32
[51] Int. Cl. .............................................. A61c 11/00
[58] Field of Search ........................................ 32/32

[56] References Cited

UNITED STATES PATENTS

| 2,097,701 | 11/1937 | Pfeiffer | 32/32 |
| 3,482,312 | 12/1969 | Smith | 32/19 |
| 3,206,852 | 9/1965 | Swanson | 32/32 |

*Primary Examiner*—Robert Peshock
*Attorney*—Robert E. Strauss

[57] ABSTRACT

Dental supports for clutches in an articulator are described which are used to facilitate the mounting of the clutches and their dependent dental instruments in an articulator. The supports comprise a base member which is removably attached to the dental cast support screw of each articulator frame member with a telescoping member that bears a clutch support plate and that can be locked to the base member at any desired extension therein. The supports are used when the adjustable fossa and incisal guides of the articulator are to be set to duplicate a paitent's border mandibular movements. In this method, a pantograph with attached clutches is positioned in the articulator in the proper anatomical relationship to the articulator control surfaces. The clutch support plates of the accessory of this invention are then extended from their base members into proximate positions to their respective clutches, a curable plastic is placed between the clutches and the support plates, and the articulator is maintained in its centric position until the plastic cements the clutches to their support plates.

13 Claims, 4 Drawing Figures

INVENTOR.
NILES F. GUICHET

PATENTED JAN 9 1973 3,708,882

SHEET 2 OF 2

INVENTOR
NILES F. GUICHET
BY
*Robert E. Strauss*
ATTORNEY

DENTAL ARTICULATOR ACCESSORY

DESCRIPTION OF THE INVENTION

This invention relates to means for mounting dental clutches and an attached pantograph in an articulator to permit adjustment of the articulator to a pantographic record. The invention also relates to a method for using the mounting means.

In dental restoration, appliances are fabricated from models formed on dental articulators which have provided varied capability in simulation of mandibular movement. Recent advances in articulator design have achieved precision instruments which can be adjusted for most if not all mandibular movements with the aid of devices for recording of mandibular movement such as checkbite records, face bows, hinge axis locators, etc.

Pantograph tracings of the determinate, i.e., border, mandibular movements have been used to set the various adjustable guides of the articulator. The pantograph tracings can be made with the pantograph such as disclosed in my prior patent using a pair of face bows which are supported by clutches that are attached thereto. These clutches are cast on the patients' teeth before any of the teeth have been cut, preparatory to the fitting of the appliances or dental restorations.

Prior use of these tracings has required the mounting of the clutches in the articulator using a fairly involved technique. Casts of the maxillary and mandibular teeth are prepared. A pantograph, comprising upper and lower face bows, is supported with each face bow on the upper and lower teeth, respectively, of the patient by clutch means. One of the face bows bears posterior hinge axis pins which are aligned along the condylar hinge axis. A support rod, which is anteriorly positioned on the pantograph, is aligned to an anterior reference point on the patient. The pantograph is subsequently transferred to the articulator by inserting the hinge axis pins in seating recesses on the hinge axis of the articulator and resting the support rod on the work surface. Acrylic plastic protrusions are deposited on the tooth surface of these clutches and permitted to harden. Thereafter, clutches are plastered to the mounting rings of the articulator.

The aforementioned procedure is time consuming and provides several opportunities for imprecise alignment of the clutches and the dental appliances such as face bows that are attached thereto in the articulator.

It is therefore an object of this invention to provide a simplified, but precise method and means for mounting dental clutches in an articulator.

It is also an object of this invention to provide such method and means that will reduce the steps necessary to mount clutches in an articulator.

It is an additional object of this invention to provide such method and means which permit simultaneous mounting of the maxillary and mandibular clutches in an articulator.

Other and related objects will be apparent from the following description of the invention.

The preceding objects are achieved by the apparatus of this invention which comprises detachable clutch support means for a dental articulator. The support means; one of which is provided for each articulator frame member; have a base member which can be removably attached to the articulator frame member, and a clutch support plate carried by a telescoping member which is slidably supported by the base member with means to lock the support plate and telescoping member at any vertical extension in the base member.

The method of this invention can employ a conventional pantograph with its recording means to obtain the correct, i.e., anatomical or sliding condyle supports 33. Opposite ends of crossbar 20 are slotted at 24; see FIG. 2. The condyle supports are bored and threaded to receive the threaded end of a shaft which extends through slot 24 and keyway 18. A hand wheel 30 is splinded onto the shaft so that rotation of the wheel will lock the sliding condyle support in the keyway. The condyles are carried by the upper end of the shafts 25 at opposite sides of the instrument. These condyles provide the rear bearing surfaces for the upper frame 32 of the articulator. The upper frame rests on the condyles to provide a hinged connection between the upper and the lower frames at their posterior ends.

The upper frame 32 is an elongated plate with its anterior end supported by the incisal pin 34. Projecting from each side of the posterior end of frame 32 are the fossa guide assemblies which rest on their respective condyles.

Centrally positioned on each of the upper and lower frames are dental cast mounting screws 11 and 31 which removably secure dental cast mounts of conventional construction to permit the attachment of dental casts to the frames.

The devices of this invention are shown as they are secured to the articulator which is described in detail in my prior U.S. Pat. No. 3,590,467, frame members 10 and 32 using screws 11 and 31 to attach the upper and lower base members of the devices. The base members 13 and 33 are shown as generally cylindrical posts, however, other shapes can be used as desired. The bases are bored and tapped at 15 and 37 to receive screws 11 and 31.

The base members are bored to support extendible members which are formed of shafts 17 and 39 which telescope into these base members and which carry at their opposite ends the clutch support plates 19 and 41.

The anterior of the frame 32 terminates with a longitudinal block 35 that is locked to the frame 32 by thumbscrew 39. The anterior face of block 35 is convex as shown in FIG. 1 and has a slot 91 which engages a mating arcuate key of block 90. The incisal pin 34 is press fitted into a bore in block 90. This block and the anterior end of block 35 mate in an arcuate fit so that the angular relationship between the pin and frame 32 can be varied and observed on the scale of block 90. Screw 70 interlocks block 90 to block 35 at any angular position along groove 91.

The lower end of pin 34 carries guide 72 which has a dovetail groove 73 that fits a matching dovetail on shoe 74. Shoe 74 is engaged in dovetail guide 72 in a sliding fit that is locked by screw 76 in the guide. The shoe in the centric position lies on pin support 78 which is carried by the rear of the incisal table. Support 78 is removably secured to the lower frame by thumb screw 82. The anterior end of frame 10 is slotted and block 78 has a mating key along its lower edge that fits into the slotted frame 10 and screw 82 is then turned to lock block 78 to frame 10. Block 78 will have a fixed vertical relationship to frame 10 regardless of any adjustments that may be made in the incisal table assembly as hereinafter described. Block 78, therefore, is a removable rest for the incisal pin that has a fixed vertical position in the articulator.

Incisal table housing 88 is pivotable on pins 86 and carries incisal guide wings 92 which are bored at 95 to receive screws 96. Wings 92 are pivotable along longitudinal axes and their outside surfaces are arcuate and mate with an arcuate cut in the sides of housing 88, with the radius of curvature of these surfaces being about a centerline passing through the pivot axes. Screws 96 lock the wings in any angular position about their axes, and their angle of inclination is registered by the scales on the face of housing 88.

The fossa guide assemblies are mounted on main angle blocks or bracket members such as 50 which are pivotably secured by screws 52 to wing brackets such as 51. Wing bracket 51 is pivotally mounted on the telescoping lateral arm 55 carried by upper frame 32. Wing 51 pivots on the hinge axis centerline passing through condyles 26 and a screw such as 56 on the centerline projects through flange 57 and pivotally secures wing 51 to arm 55.

The fossa guide assemblies are provided with multiple adjustable surfaces to permit duplication of the condyle guide surfaces found in the human fossa. These fossa guide assemblies include a superior guide member 36, a rear wall or posterior guide member 38, and a lateral guide member 40. The lateral guide member functions to guide the frames through movements having a lateral directional component. All of these fossa guide members pivot about a common center of rotation at the center of condyle 26. The angular setting of posterior guide member 38 is locked by screw 44; that of superior guide member 36 is locked by screws 42 and 52; see FIG. 2; and that of medial wall guide member 40 by screw 46. The angular settings of the guide surfaces of the members are registered on scales on the assemblies.

Figure 3:
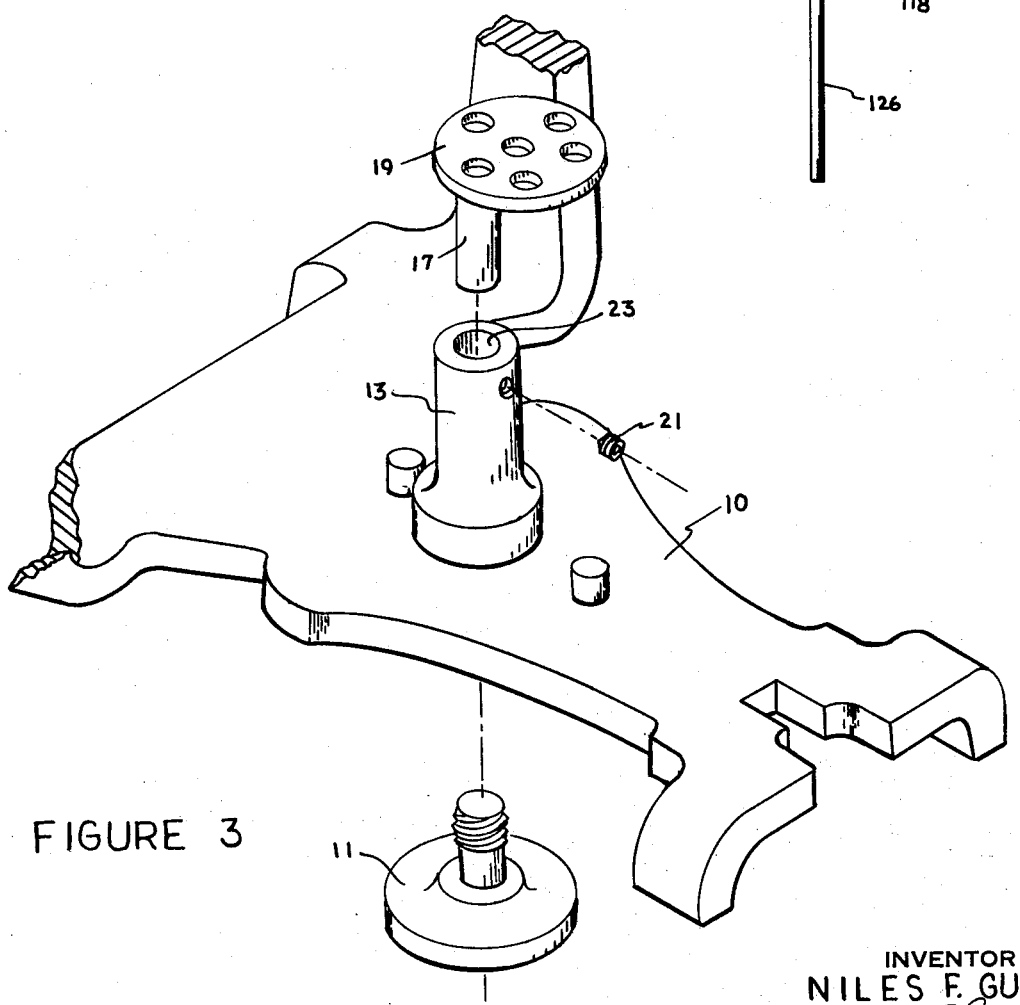

FIG. 3 shows the lower member in an exploded view and plate 19 is shown as a generally circular plate having a plurality of apertures which permit extrusion of the plastic through the plate to increase its retention by the plastic. The vertical position of the extendible member in the base member can be locked by set screw 21 which is inserted into a tapped bore in the base member along its longitudinal bore 23. If desired, a keyway can be provided on either shaft 17 or bore 23 with a mating key on the other member to index the plate 19 in bore 23 against rotation.

Figure 4:
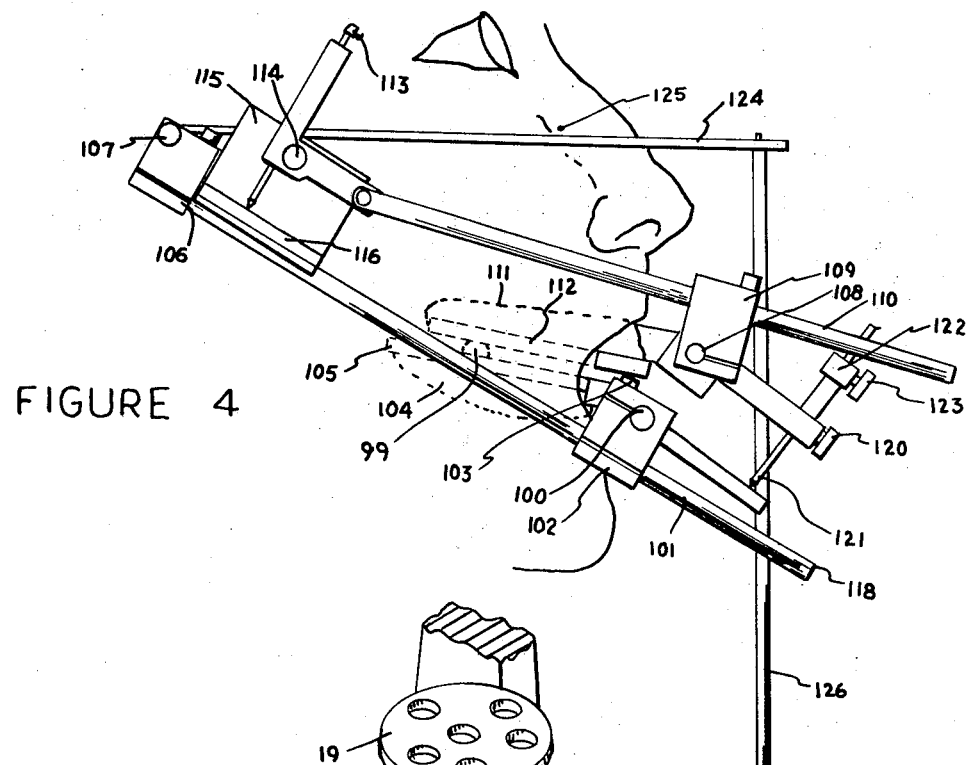

FIG. 4 shows a precision pantograph such as described in my U.S. Pat. Nos. 3,431,649 and 3,490,146. This pantograph comprises upper and lower face bows which are U-shaped with sidearms which extend posteriorly from anterior crossbars. The lower face bow has crossbar 100 that support sidearms 101 with split block clamps 102 which have screw 103 to lock the arms 101 and crossbar 100 in their split bores of the block clamp. A mandibular dental clutch 104 formed from a plastic casting about support fork 105 is centrally indexed and removably locked to the crossbar in the manner described in my U.S. Pat. No. 3,508,333. The clutch is engaged by the mandibular teeth of the patient, thereby supporting the lower face bow on the patient, as shown. Centrally positioned on the clutch is fulcrum pin 99 which bears against a guide surface in the upper clutch in the manner described in my U.S. Pat. Nos. 3,508,333 and 3,590,467. The posterior ends of the sidearms 101 support a block clamp 106 in which is inserted pin 107 which is aligned opposite the mandible hinge axis. A recording table formed of an upright plate 115 and a transverse plate 116 is also attached to the sidearms 101.

The upper face bow is similarly formed with crossbar 108, clamp blocks 109 and sidearms 110, and is supported on the maxillary teeth by clutch 111 and fork 112 with the clutch 111 being centrally indexed and removably secured to the upper crossbar 108. The posterior ends of sidearms 110 support an assembly of a horizontal plane recording stylus 113 and a saggital plane recording stylus 114 which are supported on pneumatically actuated pistons within cylinders of the assembly to permit remote actuation and engagement with tracing paper carried on plates 115 and 116 in the manner described in my U.S. Pat. Nos. 3,508,333 and 3,590,467.

The lower crossbar also supports a clamp 117 which slidably engages rod 126 and two tables 118, one on each side of the crossbar. Positioned above each table 118 is an anterior tracing assembly 119 with a stylus (not shown) which can trace mandibular movements on recording paper positioned on the table. There is also a clamp with screw 120 which can lock pin 121 at any vertical setting. These pins 121, one at each side, together with fulcrum pin 99 form a tripod. When the jaw is in centric relation, the positions of the pins 121 on tables 118 are recorded by a wax impression on the point of each pin on its respective table. The vertical positions of the pins are recorded by sliding blocks 122 that rest on the tops of the cylindrical pin holders of 119 and by locking screws 123 with the blocks resting on the cylinders. The vertical position of rod 126 is set by placing a generally U-shaped plate 124 with its bight resting on the rod and each of its legs resting on hinge axis centering pins 107. The plate is then aligned into a generally horizontal plane with its anterior end opposite a dot 125 which has previously been placed on the patient's face.

The pantograph is transferred to the articulator as shown in FIG. 1. The ends of pins 107 are engaged in mounting recesses on the hinge axis of the articulator and the rod 126 is rested on the table or work surface. The check bite pins 121 are placed in clamps 119 and secured by screws 123, and the upper face bow is rested on the resulting tripod formed by fulcrum pin 99 and pins 121 which are seated in their impressions in the wax on tables 118.

Screws 21 in each of base members 13 and 33 are loosened and the extendible members bearing the clutch support plates 19 and 41 are extended into proximity with the clutches. The instrument is then opened, some cold curing plastic such as an acrylic impression plastic or plaster is placed on the lower plate 19 and the upper surface of the maxillary clutch 111, and the instrument is then closed into the position shown. This results in embedding of the plates 41 and 19 in the plastic 130 and 131 which hardens to cement the clutches to the plates. In this manner, a simple and direct orientation of the pantograph in the articulator is achieved.

The invention has been described with regard to the method of mounting of a pantograph in a precision articulator. It is not intended by this illustration that the invention be unduly limited to only this method. Instead, it is intended that the apparatus of this invention be useful for other purposes. An illustration of such other application of the apparatus is the use of the dental support of the lower frame member of the articulator to support the weight of the upper cast when it is plastered into the articulator by placing plaster between the cast and the mounting ring of the upper frame member.

The invention has been described by reference to the presently preferred mode of practice thereof. It is not intended by this illustration that the invention be limited only to the illustrated means and method, but rather it is intended that the invention be defined by the method steps and their obvious equivalents, and by the means and their obvious equivalents set forth in the following claims.

I claim:

1. In a dental articulator comprising a first frame member supporting a condyle at each of the opposite sides of its posterior end and a second frame member supporting, at each opposite side of its posterior end, a fossa guide assembly bearing control surfaces in engagement with its respective condyle of said first frame member and with incisal pin and incisal pin guide means bearing control surfaces supported by said members at their anterior ends wherein said fossa guide assemblies and incisal pin guide means provide adjustable guide surfaces to permit relative movement of said members in simulation of mandibular movements, the improved means for rapidly securing dental clutches to said frame members in spacial positions relative to said guide surfaces which duplicate their anatomical relationship to the maxillary condylar guide surfaces which comprises: a base member centrally positioned on at least one of said frame members and removably secured thereto by attachment means permitting its removal, a clutch support member secured to said base member with means permitting adjustable variation in the vertical spacing of the clutch support member from said base member into proximity to the mid line between said frame members and to the position occupied by the clutch associated with said frame member when said clutch is positioned in said articulator in said anatomical relationship to said guide control surfaces.

2. The articulator of claim 1 wherein said clutch support member comprises a plate supported by a post that is slidably mounted in a bore in said base member with set screw means to lock said post at any extension in said bore.

3. The articulator of claim 1 wherein said base members are secured to said articulator frames by centrally positioned screw means carried by said frame members.

4. The articulator of claim 1 wherein said base members and clutch support members are secured to each of said first and second frame members.

5. The method for the mounting of a pantograph in a dental articulator having first and second frame members hinged together at their posterior ends with adjustable hinge joint means that permit simulation of the anatomical movements of the mandible which comprises: temporarily securing to each of said members a clutch support member comprising a base member and a vertically extendible clutch support plate, positioning a pantograph comprising a pair of dental face bows, each bow thereof having dependently supported thereon a dental clutch, at a predetermined spacial relationship to the maxillary fossa guide surfaces, extending each of said clutch support plates into a proximate position to its respective dental clutch, locking said plates in such position, and interlocking said clutches to said plates.

6. The method of claim 5 wherein said clutches are interlocked to said plates by placing a cement between said clutches and said plates.

7. The improved means of claim 1 wherein one of said base and clutch support members bears a keyway and the other of said members bears a mating key to prevent rotation of said clutch support member.

8. The combination of a dental articulator comprising a first frame member supporting a condyle at each of the opposite sides of its posterior end and a second frame member supporting, at each opposite side of its posterior end, a fossa guide assembly in engagement with its respective condyle of said first frame member and with incisal pin and incisal pin guide means supported by said members at their anterior ends wherein said fossa guide assemblies and incisal pin guide means provide adjustable guide surfaces to permit relative movement of said members in simulation of mandibular movements, a base member centrally positioned on at least one of said frame members and secured thereto by means permitting its removal, a clutch support member secured to said base member with means permitting adjustable variation in the vertical spacing of the clutch support member in said base member and a dental clutch secured directly to said clutch support member.

9. The combination of claim 8 wherein said clutch is cemented to said clutch support member.

10. The combination of claim 8 wherein each of said frame members bears a base member with its respective clutch support member and wherein the upper and lower dental clutches of a set of dental clutches are secured to said clutch support members.

11. The combination of claim 8 wherein said clutch support member has a shaft that is telescopingly mounted to said base member.

12. The combination of claim 11 wherein said shaft bears, on its inboard end, a plate for attachment to a dental clutch.

13. The combination of claim 8 wherein one of said clutch support and base members bears a keyway and the other of said members bears a mating key to prevent rotation of said clutch support member.

* * * * *